(12) United States Patent
Britton

(10) Patent No.: US 12,158,074 B2
(45) Date of Patent: Dec. 3, 2024

(54) INSPECTING ROTATING TURBINE BLADES

(71) Applicant: Baker Hughes Holdings LLC, Houston, TX (US)

(72) Inventor: Thomas Durkee Britton, Syracuse, NY (US)

(73) Assignee: Baker Hughes Holdings LLC, Houston, TX (US)

( * ) Notice: Subject to any disclaimer, the term of this patent is extended or adjusted under 35 U.S.C. 154(b) by 208 days.

(21) Appl. No.: 17/574,738

(22) Filed: Jan. 13, 2022

(65) Prior Publication Data

US 2022/0235669 A1 Jul. 28, 2022

Related U.S. Application Data

(60) Provisional application No. 63/142,674, filed on Jan. 28, 2021.

(51) Int. Cl.
| | |
|---|---|
| *F01D 21/00* | (2006.01) |
| *G06F 16/51* | (2019.01) |
| *G06T 11/60* | (2006.01) |
| *G07C 5/08* | (2006.01) |

(52) U.S. Cl.
CPC ........... *F01D 21/003* (2013.01); *G06F 16/51* (2019.01); *G06T 11/60* (2013.01); *G07C 5/0808* (2013.01); *G07C 5/0866* (2013.01); *F05D 2220/30* (2013.01); *F05D 2260/83* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 9,708,927 B2* | 7/2017 | Hatcher, Jr. ........... | F01D 21/003 |
| 2006/0078193 A1* | 4/2006 | Brummel ........... | G01N 21/9515 382/152 |
| 2013/0162846 A1* | 6/2013 | Xie ....................... | F01D 21/003 348/207.11 |
| 2019/0082943 A1* | 3/2019 | Mitsunaga ......... | A61B 1/00006 |

* cited by examiner

*Primary Examiner* — James J Lee
*Assistant Examiner* — Andrew Sang Kim
(74) *Attorney, Agent, or Firm* — Mintz, Levin, Cohn, Ferris, Glovsky and Popeo, P.C.

(57) ABSTRACT

Data characterizing an image and/or a video of a predetermined region of a turbine engine is received. The turbine engine includes a blades configured to move relative to the predetermined region. A first blade of the blades is located in the predetermined region during a first time duration. Data characterizing inspection parameters from a turning tool device, including a motor and a motor controller, and turbine engine information are received. The motor controller is configured to rotate the plurality of blades of the turbine via the motor. The first blade is identified based on the inspection parameters including an initial configuration of the turning tool device and the first time duration, an annotated image and/or an annotated video is generated, at least a portion of the turbine engine information and the identity of the first blade is annotated onto the received image and/or the received video.

9 Claims, 4 Drawing Sheets

INSPECTING ROTATING TURBINE BLADES

RELATED APPLICATION

This application claims priority under 35 U.S.C. § 119(e) to U.S. Provisional Patent Application No. 63/142,674 filed on Jan. 28, 2021, the entire content of which is hereby expressly incorporated by reference herein.

BACKGROUND

Video inspection devices, such as video endoscopes or borescopes, can be used to take depth measurements on an object (e.g., lowest points in anomalies such as pits or dents, heights of welds, measurements of offsets or clearances between surfaces, etc.). Additionally, video inspection devices can be used to observe defects (e.g., tears, cracks, scratches, etc.) on a surface of an object (e.g., an industrial machine). In many instances, the surface of the object is inaccessible and cannot be viewed without the use of the video inspection device. For example, a video inspection device can be used to inspect the surface of a blade of a turbine engine on an aircraft or power generation unit to identify any anomalies to determine if any repair or further maintenance is required. In order to make that assessment, it is often necessary to obtain highly accurate-dimensional measurements of the surface to verify that the anomaly does not fall outside an operational limit or required specification for that object.

SUMMARY

Various aspects of the disclosed subject matter may provide one or more of the following capabilities.

A method includes receiving data characterizing an image and/or a video of a predetermined region of a turbine engine, the turbine engine including a plurality of blades configured to move relative to the predetermined region. A first blade of the plurality of blades is located in the predetermined region during a first time duration. The method also includes receiving data characterizing inspection parameters from a turning tool device including a motor and a motor controller and receiving turbine engine information. The motor controller is configured to rotate the plurality of blades of the turbine via the motor coupled to the turbine engine. The method further includes identifying the first blade based on the inspection parameters including an initial configuration of the turning tool device and the first time duration. The method also includes generating an annotated image and/or an annotated video, the generating including annotating at least a portion of the turbine engine information and the identity of the first blade onto the received image and/or the received video.

One or more of the following features can be included in any feasible combination.

In one implementation, the initial configuration of the turning tool device includes an initial time indicative of commencement of turbine engine inspection and/or an angular speed of rotation of the plurality of blades. In another implementation, the method further includes generating a first database tag associated with the annotated image, wherein the first database tag includes one or more of time and/or date of acquisition of the first image, at least a portion of the received turbine engine information, and/or the identity of the first blade.

In one implementation, the method further includes displaying the received image and/or the received video in a graphical user interface (GUI) display space; requesting, via the GUI display space, turbine engine information; and receiving data characterizing user input indicative of at least a portion of the turbine engine information. In another implementation, the turbine engine information includes a turbine engine serial number, a stage number, and/or a turbine engine type.

In one implementation, the method further includes determining a database folder name based on the turbine engine information; generating a database folder having the determined database folder name; and storing the annotated image and/or the annotated video in the database folder. In one implementation, the method further includes displaying the annotated image and/or the annotated video on a graphical user interface display device.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

These and other capabilities of the disclosed subject matter will be more fully understood after a review of the following figures, detailed description, and claims.

BRIEF DESCRIPTION OF THE FIGURES

These and other features will be more readily understood from the following detailed description taken in conjunction with the accompanying drawings, in which.

DETAILED DESCRIPTION

Industrial systems (e.g., turbine engines) may need to be inspected to ensure that they are operating as desired and/or have not developed defects that can compromise their future operation. For example, a blade of a turbine engine may develop a defect over a period of time that can be detrimental to its integrity. Images and/or video of the blades of the turbine can be captured by an inspection device (e.g., a borescope) and inspected by a designated inspector. In some implementations, the blades of the turbine can be coupled to a turning device that can rotate the blades. As a blade of the turbine engine passes through a predetermined region (e.g., located in the field of view of the inspection device), an image and/or a video can be acquired and stored (e.g., in a database). This process can be repeated for multiple blades of the turbine engine.

In can be desirable to annotate the aforementioned images and/or the videos of the blades with turbine engine information (e.g., identity of the blade, identity of the turbine engine, turbine engine type, stage number, etc.), and inspection information (e.g., date/time of inspection, etc.). This can allow for identifying the blade, inspection conditions, etc., associated with the acquired image of the blade (e.g., identify the blade when analyzing the defects in the images after the inspection). In some existing inspection devices, the images/videos can be manually annotated. For example, during the inspection process, images and/or videos of the blades are presented to a user (e.g., an inspector), and the user can manually annotate the images (e.g., by entering turbine engine information). This process can be inefficient (e.g., increase the inspection time) and inaccurate (e.g., due to annotation errors by the user).

Some implementations of the current subject matter provide for an improved inspection device that can allow for automatic annotation of images and/or videos of the turbine engine. In some implementations, the improved inspection device can communicate with the turning tool device, and identify the blade whose image and/or video has been acquired. In some implementations, the improved inspection device can generate a database tag for the acquired image and/or video, and save the database tags and the image and/or video (e.g., in a database folder). The database tag can include turbine engine information, blade identity, date/time of inspection, etc. A user can search for one or more images by querying information (e.g., data/time of inspection, turbine engine type, stage where the inspection is performed, etc.) in the database tags. In some implementations, the inspection device can generate a database folder having a customized name indicative of turbine engine information (e.g., engine serial number, engine type, stage number, blade number, etc.) and store the corresponding image and/or video in the folder.

Figure 1:
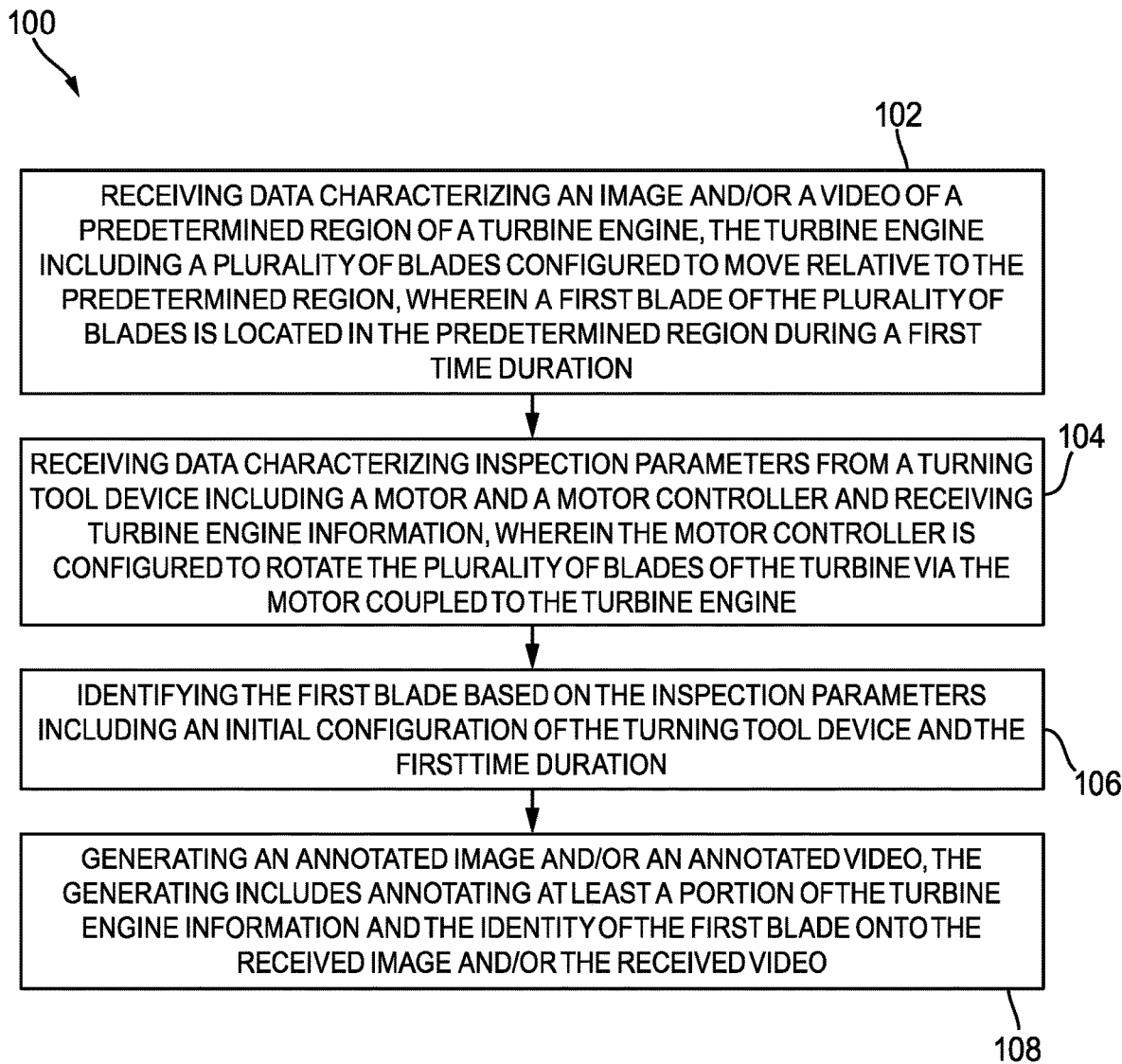
FIG. 1 is a flow chart of an exemplary method for annotating images and/or videos of a turbine engine.
Figure 2:
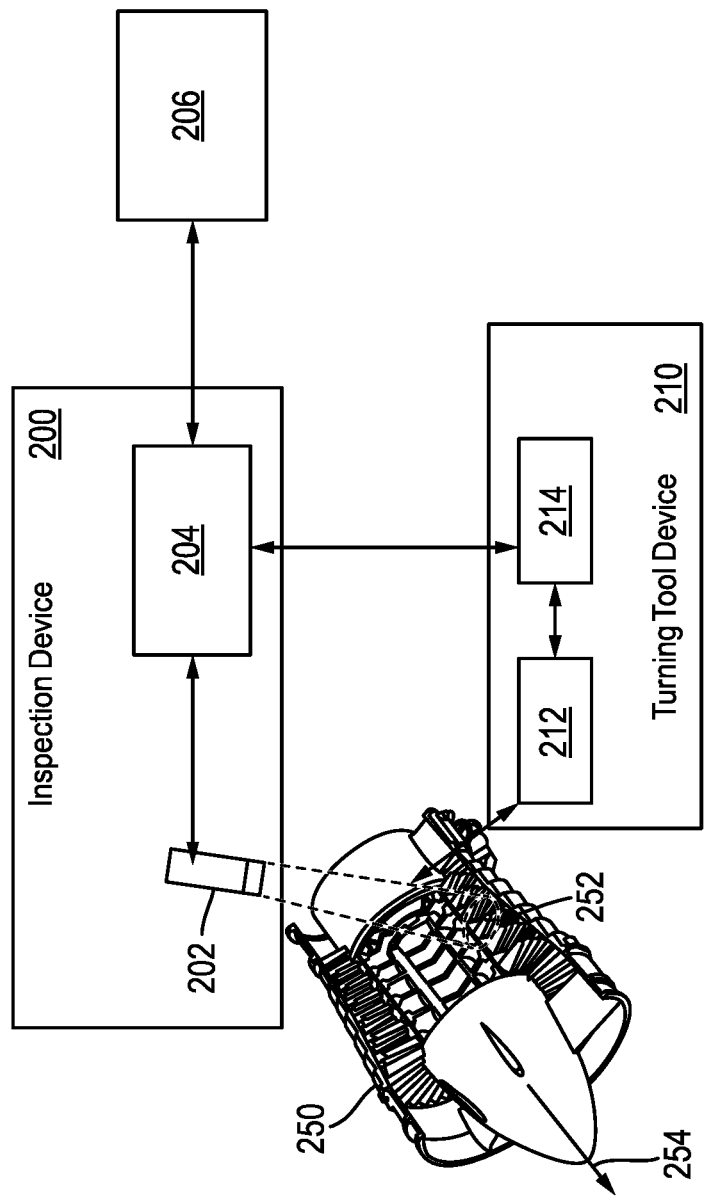
FIG. 2 is a schematic of an exemplary inspection device configured to annotate images and/or videos of a turbine engine.

FIG. 1 is a flow chart of an exemplary method for annotating images and/or videos of a turbine engine. At step 102, data characterizing an image and/or a video of a predetermined region of a turbine engine can be received. FIG. 2 is a schematic of an exemplary inspection device 200 (e.g., a borescope) configured to annotate images and/or video of a turbine engine 250. The inspection device 200 includes a camera 202 and an inspection device controller 204. The camera 202 can capture an image and/or a video ("image and/or video" hereinafter referred to as "image") of the predetermined region 252 of the turbine engine 250. The turbine engine 250 can include a plurality of blades that are configured to move relative to the predetermined region 252. For example, the blades can be configured to rotate around the axis 254. As the blades rotate, different blades can pass through the predetermined region 250. For example, a first blade can be located within the predetermined region 252 during a first period to time, and a second blade can be located in the predetermined region 252 during a second period of time.

Returning to FIG. 1, at step 104, data characterizing inspection parameters can be received. As illustrated in FIG. 2, a turning tool device 210 can include a motor 212 and a motor controller 214. The motor 212 can be coupled to the blades of the turbine engine 250 and can rotate the blades (e.g., to allow for different blades to pass through the predetermined region 252). The motor controller 214 can be configured to rotate the plurality of blades of the turbine via the motor 212 (e.g., by providing control signals to the motor 212). The inspection device controller 204 can receive various inspection parameters from the motor controller 214. The inspection parameters can include initial configuration of turning tool device. The initial configuration of the turning tool device can include an initial time when the motor 212 is instructed by the motor controller 214 to initiate the rotation of the blades of the turbine engine 250 for inspection. The device controller 204 can also receive identity of the blade that was in the predetermined region 252 at the initial time and/or the angular speed of rotation, etc. In some implementations, the inspection parameters can include information associated with the turbine engine 250. For example, the inspection information can include spatial arrangement of the blades in the turbine engine 250.

At step 104, data characterizing information associated with the turbine engine can be received. For example, the device controller 204 can receive information associated with the turbine engine 250 from the motor controller 214. Turbine engine information can include, for example, turbine engine serial number, turbine engine type, turning tool (TT) attachment number, and stage number (e.g., indicative of the stage/platform where the inspection is being performed). In some implementations, the turbine engine information (or a portion thereof) can be received from a user. For example, the image captured by the camera 202 can be displayed to a user in a graphical user interface (GUI) display space (e.g., display space of the inspection device 200, display space of a user computing device 206, etc.). The user can be requested or prompted via the GUI display space to provide turbine engine information. The user can provide a user input that can include the turbine engine information (e.g., using a touchscreen, keyboard, mouse, etc.), and data characterizing the user input can be received the device controller 204.

At step 106, a blade (e.g., the first blade) located in the predetermined region 252 during a given time period (e.g., during the first time duration) can be identified. The identification can be based on the inspection parameters (e.g., an initial configuration of the turning tool device, the first time duration, speed of angular rotation of the turbine blades, etc.) received at step 104. In one implementation, the device controller 204 can determine the identity of a blade located in the predetermined region 252 at a given time based on the identity of a blade (of the plurality of blades in the turbine engine 250) located in the predetermined region 250 at an earlier time period (e.g., the initial time of commencement of the inspection), spatial arrangement of blades in the turbine engine 250 and the angular speed of rotation of the blades (e.g., determined by the motor controller 214). For example, by multiplying the time difference between the initial time and the first time duration with the angular speed of rotation of the blades, the angular location of the blade located in the predetermined region 250 can be determined. Based on the angular location of the blade and the known arrangement of blades in the turbine engine, the first blade located in the predetermined region 252 during the first time duration can be identified. The identity of the first blade can be based on a predetermined blade number assigned to the first blade.

Figure 3:
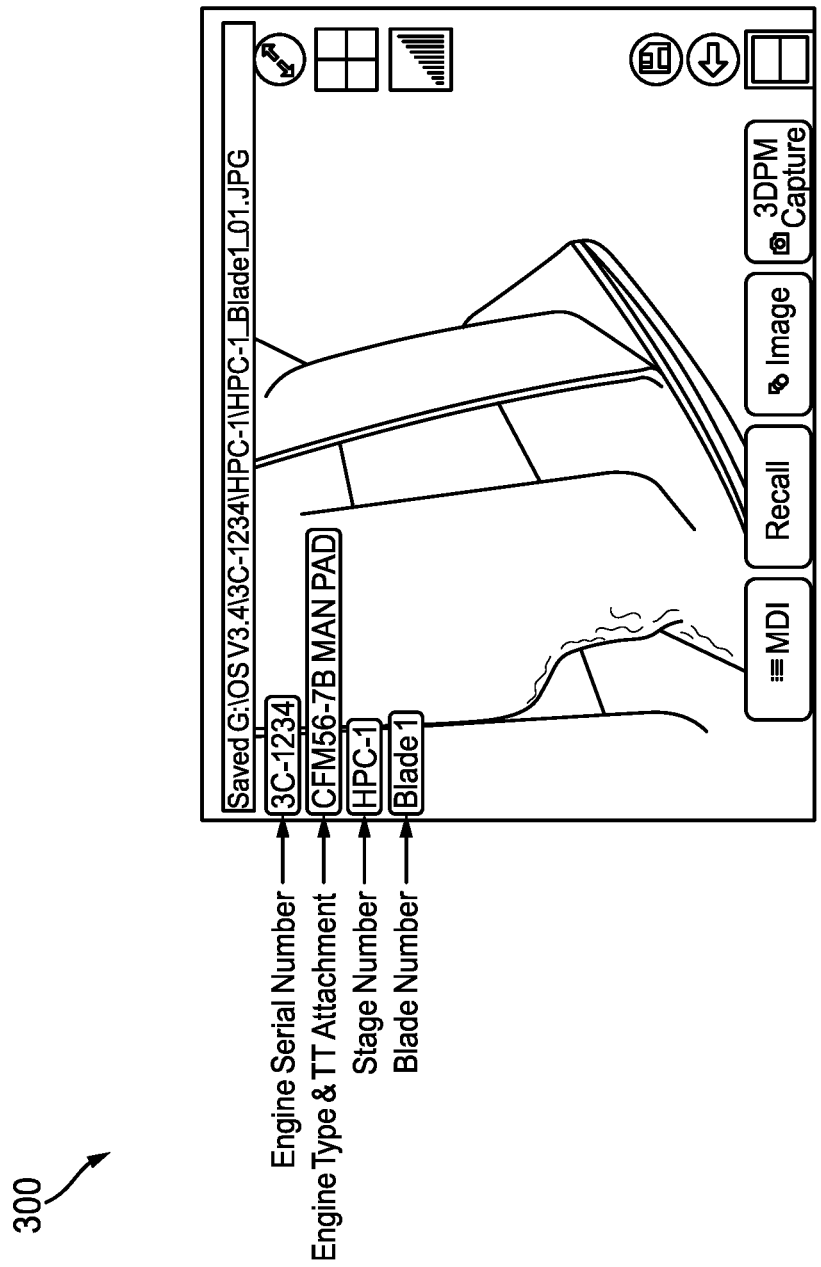
FIG. 3 illustrates an exemplary annotated image of a blade of a turbine engine.

At step 108, an annotated image and/or an annotated video can be generated. The generating includes annotating at least a portion of the turbine engine information and the identity of the first blade onto the received image and/or the received video. For example, one or more of the identity of the first blade (e.g., blade number) in the predetermined region 252 during the first time period (e.g., determined at step 106), turbine engine serial number, turbine engine type, stage number, etc. can be superimposed on the image and/or video of the first blade received at step 102 to generated the annotated image and/or video. FIG. 3 illustrates an exemplary annotated image 300 of a blade of a turbine engine. The annotated image 300 includes the engine serial number engine type, TT attachment, stage number, and blade number associated with the image.

Figure 4:
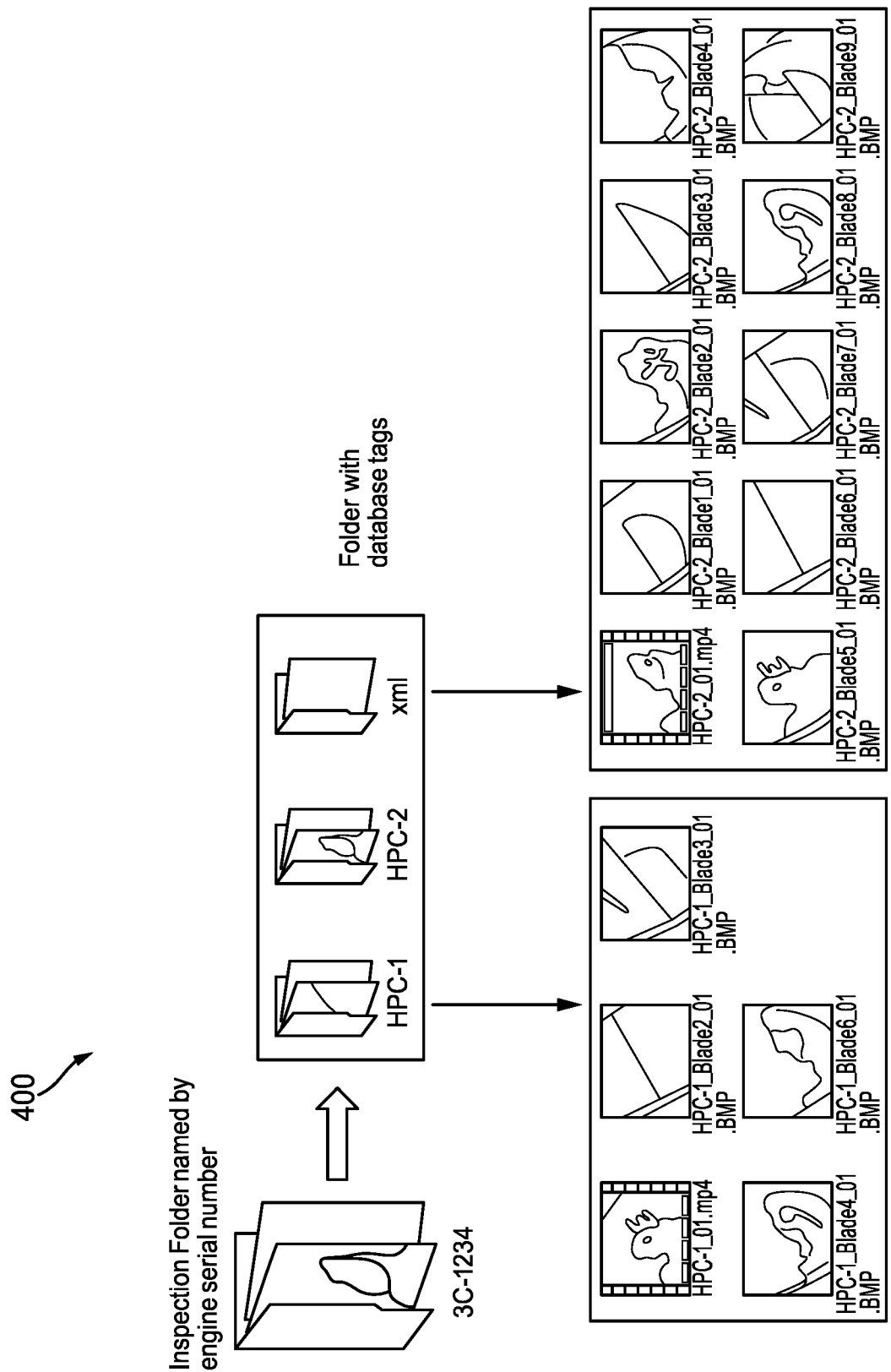
FIG. 4 illustrates an exemplary nested database folder with customized filename for storing annotated images and/or videos.

In some implementations, the annotated images and/or images acquired at step 102 can be saved in a database folder. A customized name of the database folder can be determined based the turbine engine information (e.g., can include engine serial number, stage number, blade number, etc.). A database folder can be generated having the determined database folder name, and the annotated images (e.g., generated at step 108) and/or initial images (e.g., acquired at step 102) can be saved in the database folder. In some implementations, a nested directory of folders can be generated. For example, a top-level folder can be titled based on turbine engine serial number and the first subfolder can be titled based on the stage number. Images/annotated images (or videos) of blades associated with a given turbine serial number and stage number can be stored a top-level folder and a subfolder with names including the turbine serial number and the stage number respectively. Additionally or alternately, the name of the images and/or videos can include one or more of the blade number, the engine serial number and the stage number. Generating customized folder/image names can allow a user to efficiently retrieve an image associated with a blade with a given blade number, engine serial number, stage number, etc. FIG. 4 illustrates an exemplary nested database folder with customized filename. The name of the top-level folder includes the turbine engine serial number "3C-1234" and the sub-folder names include the various stage numbers associated with the aforementioned engine serial number (e.g., "HPC-1," "HPC-2," "HPC-3," etc.).

In some implementations, database tags can be generated for the annotated images and/or videos. The database tag can include one or more of time and/or date of acquisition of the first image, at least a portion of the received turbine engine information (engine serial number, engine type, TT attachment, stage number, etc.), and the identity of the first blade (e.g., blade number). A user can search for one or more images stored in a database (e.g., database with customized folder names described above) by querying information (e.g., data/time of inspection, turbine engine type, stage where inspection is performed, etc.) in the database tags. The database tags can be stored in the database (e.g., in the database including the images and/or videos) and can be linked to the corresponding images/videos. By searching for a database tag with a given query value (e.g., engine serial number, stage number, blade number, etc.), blade images corresponding to the given query can be identified.

In some implementations, the turning tool device can be configured to operate in an automatic rotation mode that includes rotating the blades, pausing the rotation to allow for acquisition of an image of a blade, and repeating these steps for multiple blades. For example, a first blade can be moved (e.g., by rotating the blades via the motor 212) to the predetermined region (e.g., predetermined region 252), and when the entire blade (or a desirable portion thereof) is inside the predetermined region, the rotation of the blades can be paused and an image of the first blade can be acquired. In some implementation, the motor controller 214 can send a signal to the device controller 204 that the rotation has been paused; and the device controller 204 can instruct the camera 202 to acquire an image of the predetermined region including the first blade. These steps can be repeated for multiple blades. The captured image can be annotated (e.g., as described in steps 102-108 above), a database tag can be generated, and the captured and/or annotated image can be saved in a database folder with a customized folder name.

Other embodiments are within the scope and spirit of the disclosed subject matter. For example, the monitoring system described in this application can be used in facilities that have complex machines with multiple operational parameters that need to be altered to change the performance of the machines (e.g., power generating turbines). Usage of the word "optimize"/"optimizing" in this application can imply "improve"/"improving."

Certain exemplary embodiments are described herein to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a Read-Only Memory or a Random Access Memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web interface through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A method comprising:
    receiving data characterizing an image and/or a video of a predetermined region of a turbine engine, the turbine engine including a plurality of blades configured to move relative to the predetermined region, wherein a first blade of the plurality of blades is located in the predetermined region during a first time duration;
    receiving data characterizing inspection parameters from a turning tool device including a motor and a motor controller and receiving turbine engine information, wherein the turbine engine information includes a stage number and a turbine engine type, wherein the motor controller is configured to rotate the plurality of blades of the turbine via the motor coupled to the turbine engine;
    identifying the first blade based on the received inspection parameters including at least one of an initial configuration of the turning tool device, the first time duration, and the first blade number;
    generating an annotated image and/or an annotated video, the generating including annotating the turbine engine information and the identity of the first blade onto the received data characterizing image and/or the received video; and
    displaying the annotated image and/or an annotated video in a graphical user interface (GUI) display space.

2. The method of claim 1, wherein the initial configuration of the turning tool device includes an initial time indicative of commencement of turbine engine inspection and/or an angular speed of rotation of the plurality of blades.

3. The method of claim 1, further comprising generating a first database tag associated with the annotated image, wherein the first database tag includes one or more of time and/or date of acquisition of the first image, at least a portion of the received turbine engine information, and/or the identity of the first blade.

4. The method of claim 1, further comprising: displaying the received data characterizing image and/or the received video in the graphical user interface (GUI) display space; requesting, via the GUI display space, turbine engine information; and receiving data characterizing user input indicative of at least a portion of the turbine engine information.

5. The method of claim 4, wherein the turbine engine information further includes a turbine engine serial number.

6. The method of claim 1, further comprising:
determining a database folder name based on the turbine engine information;
generating a database folder having the determined database folder name; and
storing the annotated image and/or the annotated video in the database folder.

7. The method of claim 1, further comprising displaying the annotated image and/or the annotated video on a graphical user interface display device.

8. A system comprising:
at least one data processor;
memory coupled to the at least one data processor, the memory storing instructions to cause the at least one data processor to perform operations comprising:
receiving data characterizing an image and/or a video of a predetermined region of a turbine engine, the turbine engine including a plurality of blades configured to move relative to the predetermined region, wherein a first blade of the plurality of blades is located in the predetermined region during a first time duration;
receiving data characterizing inspection parameters from a turning tool device including a motor and a motor controller and receiving turbine engine information, wherein the turbine engine information includes a stage number and a turbine engine type, wherein the motor controller is configured to rotate the plurality of blades of the turbine via the motor coupled to the turbine engine; identifying the first blade based on the received inspection parameters including at least one of an initial configuration of the turning tool device the first time duration, and the first blade number;
generating an annotated image and/or an annotated video, the generating including annotating the turbine engine information and the identity of the first blade onto the received data characterizing image and/or the received video; and
displaying the annotated image and/or an annotated video in a graphical user interface (GUI) display space.

9. A computer program product comprising a non-transitory machine-readable medium storing instructions that, when executed by at least one programmable processor, cause the at least one programmable processor to perform operations comprising:
receiving data characterizing an image and/or a video of a predetermined region of a turbine engine, the turbine engine including a plurality of blades configured to move relative to the predetermined region, wherein a first blade of the plurality of blades is located in the predetermined region during a first time duration;
receiving data characterizing inspection parameters from a turning tool device including a motor and a motor controller and receiving turbine engine information, wherein the turbine engine information includes a stage number and a turbine engine type, wherein the motor controller is configured to rotate the plurality of blades of the turbine via the motor coupled to the turbine engine;
identifying the first blade based on the received inspection parameters including at least one of an initial configuration of the turning tool device, the first time duration, and the first blade number;
generating an annotated image and/or an annotated video, the generating including annotating the turbine engine information and the identity of the first blade onto the received image and/or the received video; and
displaying the annotated image and/or an annotated video in a graphical user interface (GUI) display space.

* * * * *